US006796032B2

(12) United States Patent
Horng

(10) Patent No.: US 6,796,032 B2
(45) Date of Patent: Sep. 28, 2004

(54) FRUIT SLICER

(75) Inventor: Ruey-Lan Horng, Yung-Kang (TW)

(73) Assignee: Kuang Tai Enterprise Ltd., Tainan Hsien (TW)

( * ) Notice: Subject to any disclaimer, the term of this patent is extended or adjusted under 35 U.S.C. 154(b) by 0 days.

(21) Appl. No.: 10/623,548

(22) Filed: Jul. 22, 2003

(65) Prior Publication Data

US 2004/0117989 A1 Jun. 24, 2004

(30) Foreign Application Priority Data

Oct. 11, 2002 (TW) ...................................... 91216157 U

(51) Int. Cl.$^7$ ................................................ A21C 5/08
(52) U.S. Cl. ........................................... 30/114; 30/302
(58) Field of Search ........................... 30/114, 301, 302, 30/303, 314, 320, 115

(56) References Cited

U.S. PATENT DOCUMENTS 593,386 A * 11/1897 Williams ..................... 30/115
4,759,125 A * 7/1988 Olaes ........................... 30/114
5,533,442 A * 7/1996 Tateno .......................... 99/541
5,613,431 A * 3/1997 Tateno .......................... 99/541
6,516,519 B2 * 2/2003 Meyer .......................... 30/114

* cited by examiner

*Primary Examiner*—Douglas D. Watts
(74) *Attorney, Agent, or Firm*—Rosenberg, Klein & Lee

(57) ABSTRACT

A fruit slicer includes an X-hinged device including two handles pivoted by a pivot that separates the X-hinged device into an upper portion and a lower portion, an arcuate resilient plate having two ends fixed to the upper portion of the X-hinged device, and a plurality of blades each having a first end fixed to the arcuate resilient plate and a second end fixed in a recessed portion of the X-hinged device. A respective pair of the blades has a gap therebetween. An elastic element is mounted between the handles for biasing the handles away from each other. The arcuate resilient plate is deformed when the handles are pressed toward each other, thereby reducing the gap. The arcuate resilient plate restores its shape when the handles are released.

3 Claims, 4 Drawing Sheets

FRUIT SLICER

BACKGROUND OF THE INVENTION

1. Field of the Invention

The present invention relates to a fruit slicer that slices a flesh of fruit into a plurality of pieces in a single slicing movement.

2. Description of the Related Art

The flesh of fruit can be sliced for direct eating or subsequent processing including making juice in a juicer or mixer. The flesh of fruit is generally sliced piece by piece with a knife, which is time-consuming and thus uneconomic, particular to restaurants or parties. Further, it is not uncommon that the user of the knife is injured by the exposed cutting edge of the knife.

SUMMARY OF THE INVENTION

An object of the present invention is to provide a fruit slier that slices the flesh of fruit into a plurality of pieces in a single slicing movement.

A fruit slicer in accordance with the present invention includes an X-hinged device including two handles pivoted by a pivot that separates the X-hinged device into an upper portion and a lower portion, an arcuate resilient plate having two ends fixed to the upper portion of the X-hinged device, and a plurality of blades each having a first end fixed to the arcuate resilient plate and a second end fixed in a recessed portion of the X-hinged device. A respective pair of the blades has a gap therebetween. An elastic element is mounted between the handles for biasing the handles away from each other.

The arcuate resilient plate is deformed when the handles are pressed toward each other, thereby reducing the gap. The arcuate resilient plate restores its shape when the handles are released.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
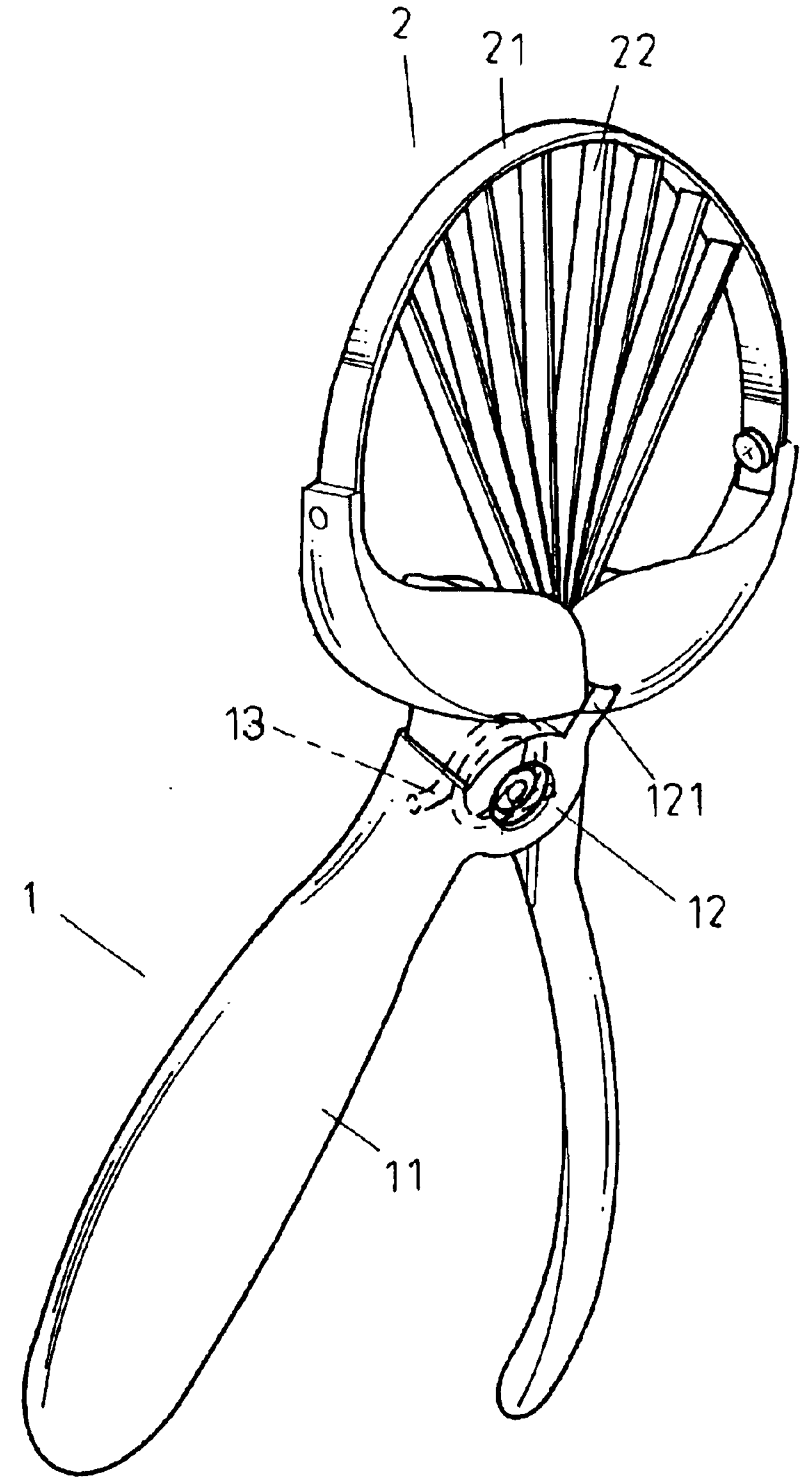
FIG. 1 is a perspective view of a fruit slicer in accordance with the present invention.

Referring to FIG. 1, a fruit slicer in accordance with the present invention generally comprises an X-hinged device 1 including a pair of handles 11 pivoted by a pivot 12 that separates the X-hinged device 1 into a lower portion for grasp and an upper portion. A recessed portion 121 is defined in the upper portion of the X-hinged device 1.

An elastic element, e.g., a coil spring 12 is attached between the handles 12 for biasing the handles 12 away from each other. Preferably, the coil spring 12 has a coil portion mounted around the pivot 12 and two ends respectively abutting against the handles 11.

A frame 2 is fixed to the upper portion of the X-hinged device 1. In this embodiment, the frame 2 includes a substantially arcuate resilient plate 21 having two ends respectively fixed to two ends of the upper portion of the X-hinged device 1. A plurality of blades 22 are provided, wherein each blade 22 has a first end fixed to the substantially arcuate resilient plate 21 and a second end fixed to the recessed portion 121 of the upper portion of the X-hinged device 1.

Figure 2:
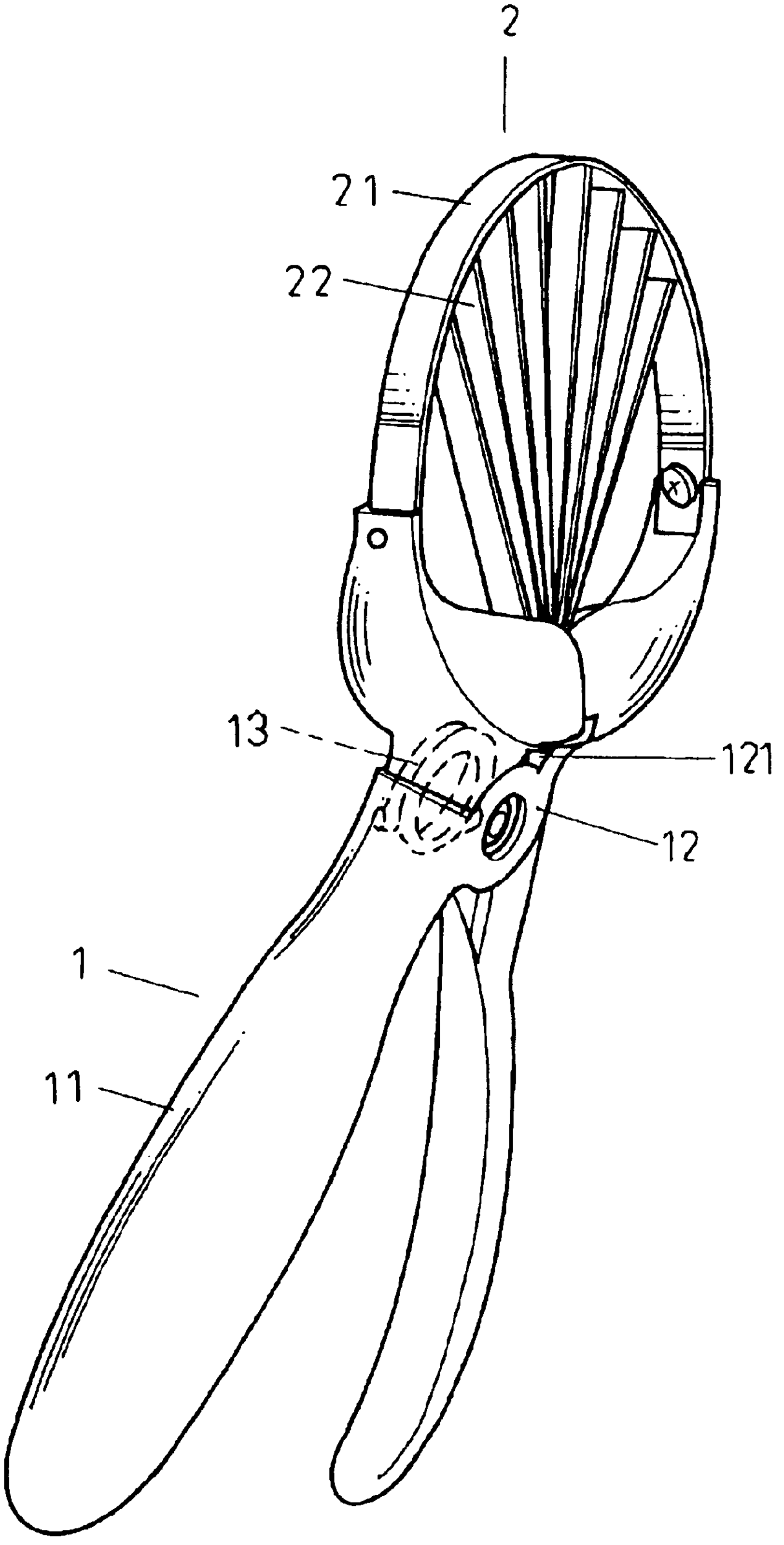
FIG. 2 is a perspective view of the fruit slicer, wherein the handles of the slicer are pressed for slicing a flesh with a narrower width or a narrower portion of the flesh.

Referring to FIG. 2, when the handles 12 are pressed, the two ends of the substantially arcuate resilient plate 21 are moved toward each other such that the spacing or gap between two adjacent blades 22 is reduced. More specifically, the force applied to the handles 11 decides the gap between two adjacent blades 22. Namely, the greater the applied force is, the smaller the gap is. This allows the user to adjust the thickness of the sliced pieces while slicing the flesh of fruit. The handles 11 return their original position and the arcuate resilient plate 21 restores its shape when the force is released.

Figure 3:
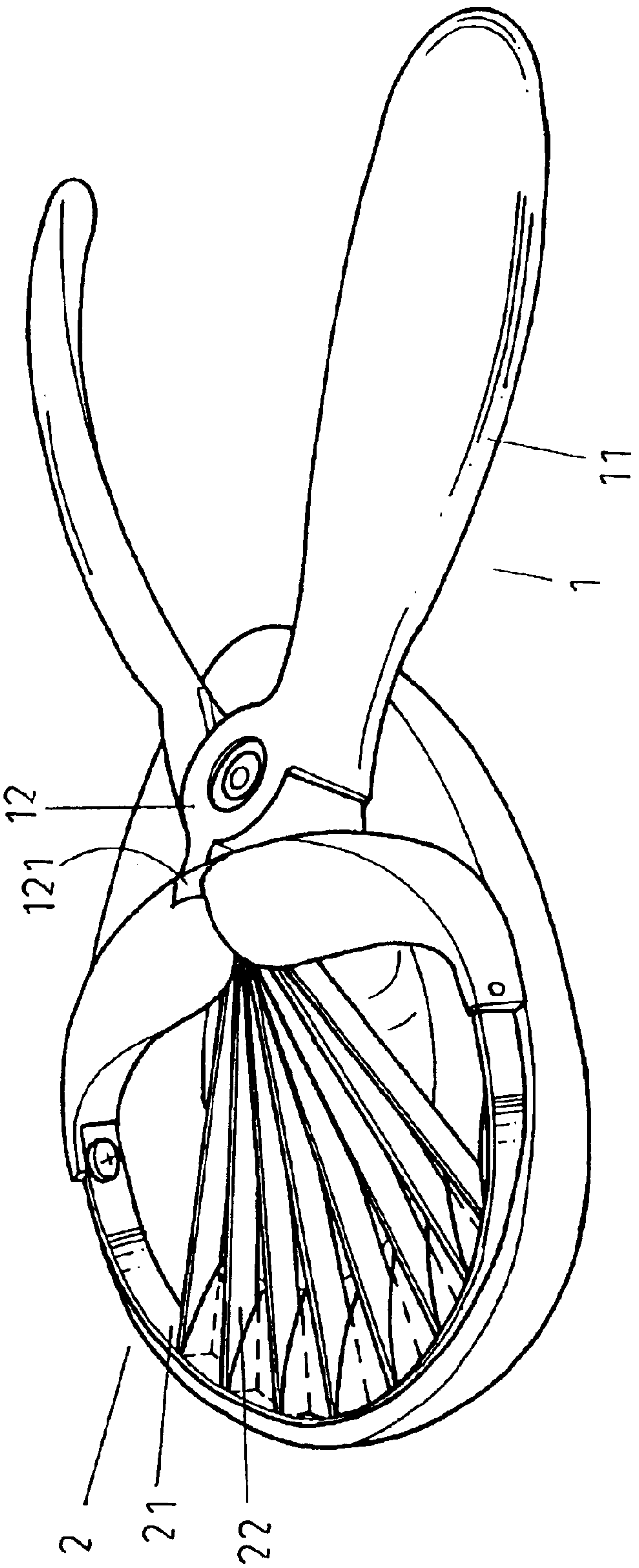
FIG. 3 is a perspective view illustrating beginning of a slicing operation of the fruit slicer in accordance with the present invention.
Figure 4:
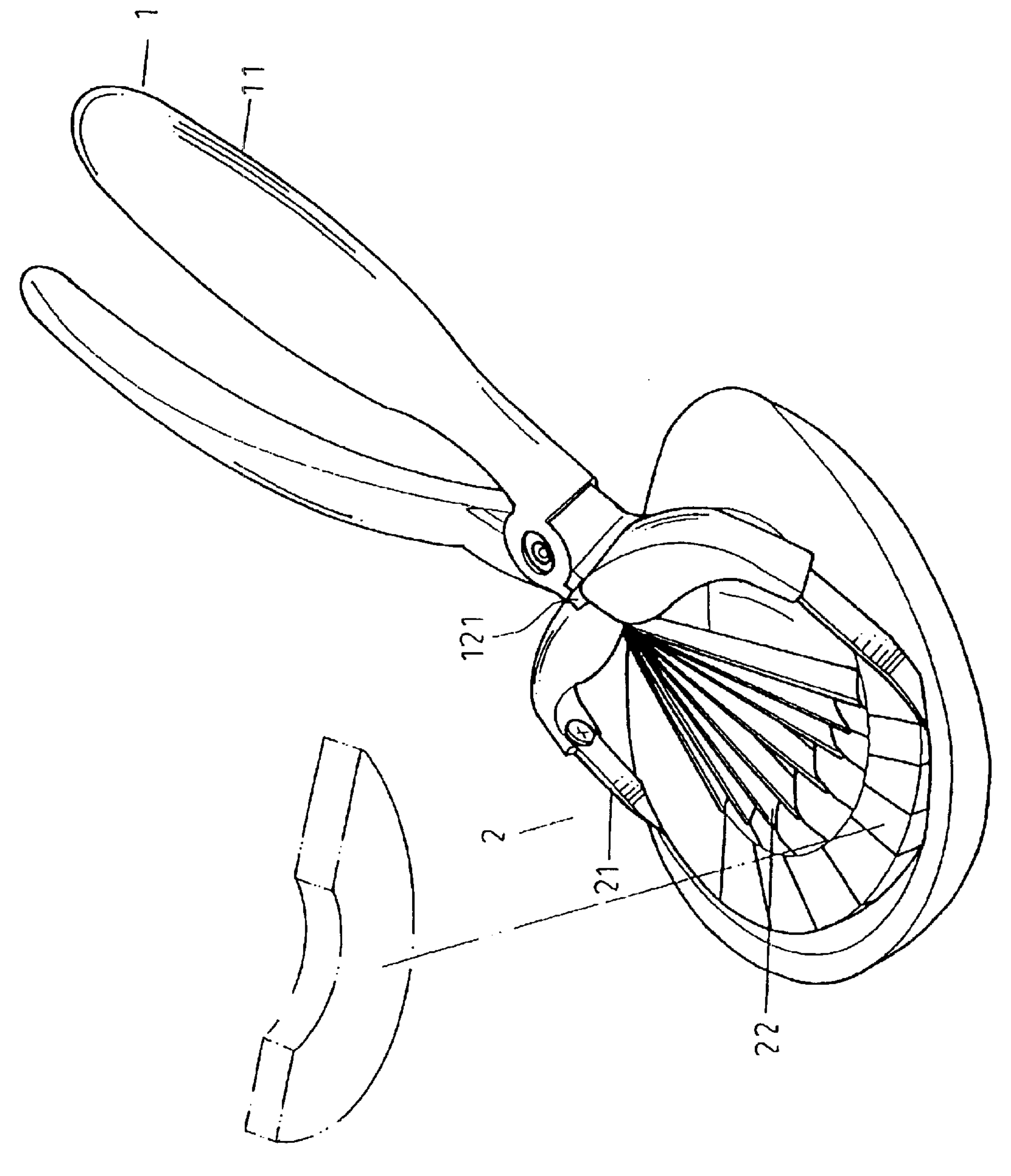
FIG. 4 is a perspective view similar to FIG. 3, illustrating further slicing of the flesh by the fruit slicer.

Referring to FIG. 3, in use, for slicing a half sliced fruit (e.g., an avocado), in the beginning, the fruit slicer is in a position at a small acute angle with a horizontal plane, with the first end of each blade 22 being in contact with an end portion of the half sliced avocado. Then, the fruit slicer is moved toward the other end of the half sliced avocado, during which the fruit slicer is gradually moved to a position at a larger acute angle with the horizontal plane, as shown in FIG. 4. The half sliced avocado is further sliced into a plurality of pieces at a single slicing movement. It is noted that the handles 11 of the fruit slicer may be pressed when the fruit slicer is moved through a narrower portion of the fruit slicer. Namely, the handles 11 of the fruit slicer are firstly pressed in the beginning of the slicing movement. The handles 11 of the fruit slicer are then released such that the gap between two adjacent blades 22 increases in response to the increasing width of the half sliced avocado, and the handles 11 of the fruit slicer are then pressed again when the fruit slicer has passed through the widest portion of the half sliced avocado. The substantially arcuate resilient plate is made of a material that can be deformed when the handles 11 are pressed toward each other. After the single slicing movement of the fruit slicer, the avocado is sliced into a plurality of pieces.

The fruit slicer in accordance with the present invention may thus be used to slice flesh of a non-uniform width through manual control of the handles 11.

Preferably, the blades 22 extend in an area not beyond two edges of the substantially arcuate resilient plate 21. This largely reduces the risk of injury to the user while slicing the fruit.

Although the invention has been explained in relation to its preferred embodiment, it is to be understood that many other possible modifications and variations can be made without departing from the scope of the invention as hereinafter claimed.

What is claimed is:

1. A fruit slicer comprising:

an X-hinged device including two handles pivoted by a pivot that separates the X-hinged device into an upper portion and a lower portion, the upper portion of the X-hinged device having a recessed portion;

an arcuate resilient plate having two ends fixed to the upper portion of the X-hinged device;

a plurality of blades each having a first end fixed to the arcuate resilient plate and a second end fixed in the recessed portion of the X-hinged device, a respective pair of the blades having a gap therebetween; and an elastic element mounted between the handles for biasing the handles away from each other;

wherein the arcuate resilient plate is deformed when the handles are pressed toward each other, thereby reducing the gap; and wherein the arcuate resilient plate restores its shape when the handles are released.

2. The fruit slicer as claimed in claim 1, wherein the elastic element includes a coil spring mounted around the pivot and having two ends respectively abutting against the handles.

3. The fruit slicer as claimed in claim 1, wherein a size of the gap is decided by a force applied to the handles.

* * * * *